(12) United States Patent
McNally et al.

(10) Patent No.: US 9,076,262 B2
(45) Date of Patent: Jul. 7, 2015

(54) SCRIPTED STEREO CURVES FOR STEREOSCOPIC COMPUTER ANIMATION

(71) Applicant: DreamWorks Animation LLC, Glendale, CA (US)

(72) Inventors: Philip McNally, Eagle Rock, CA (US); Matthew Low, Santa Monica, CA (US)

(73) Assignee: DreamWorks Animation LLC, Glendale, CA (US)

( * ) Notice: Subject to any disclaimer, the term of this patent is extended or adjusted under 35 U.S.C. 154(b) by 253 days.

(21) Appl. No.: 13/802,632

(22) Filed: Mar. 13, 2013

(65) Prior Publication Data

US 2014/0036036 A1 Feb. 6, 2014

Related U.S. Application Data

(60) Provisional application No. 61/678,568, filed on Aug. 1, 2012.

(51) Int. Cl.
| | | |
|---|---|---|
| *H04N 13/02* | (2006.01) | |
| *G06T 13/20* | (2011.01) | |
| *G06T 19/00* | (2011.01) | |
| *H04N 13/00* | (2006.01) | |
| *G11B 27/28* | (2006.01) | |

(52) U.S. Cl.
CPC .............. *G06T 13/20* (2013.01); *G06T 19/006* (2013.01); *H04N 13/0239* (2013.01); *H04N 13/0007* (2013.01); *H04N 13/0203* (2013.01); *H04N 13/0022* (2013.01); *H04N 13/0246* (2013.01); *H04N 13/0275* (2013.01); *H04N 2013/0081* (2013.01); *G11B 27/28* (2013.01)

(58) Field of Classification Search
CPC .......... H04N 13/0242; H04N 13/0048; H04N 13/0059; H04N 13/0404; H04N 13/0239; H04N 13/0296; H04N 13/0055; H04N 2013/0081; G06T 7/0022
USPC ............................................................. 348/47
See application file for complete search history.

(56) References Cited

U.S. PATENT DOCUMENTS

| | | | |
|---|---|---|---|
| 6,496,598 B1 * | 12/2002 | Harman ...................... 382/154 |
| 6,512,892 B1 | 1/2003 | Montgomery et al. | |
| 6,516,099 B1 * | 2/2003 | Davison et al. ............... 382/284 |
| 6,798,406 B1 * | 9/2004 | Jones et al. .................... 345/419 |
| 7,027,659 B1 * | 4/2006 | Thomas ........................ 382/254 |

(Continued)

OTHER PUBLICATIONS

Notice of Allowance received for U.S. Appl. No. 13/802,692, mailed on Jan. 5, 2015, 9 pages.

(Continued)

*Primary Examiner* — Sath V Perungavoor
*Assistant Examiner* — Howard D Brown, Jr.
(74) *Attorney, Agent, or Firm* — Morrison & Foerster LLP

(57) ABSTRACT

A computer-implemented method for determining a user-defined stereo effect for a computer-animated film sequence. A stereo-volume value for a timeline of the film sequence is obtained, wherein the stereo-volume value represents a percentage of parallax at the respective time entry. A stereo-shift value for the timeline is also obtained, wherein the stereo-shift value represents a distance across one of: an area associated with a sensor of a pair of stereoscopic cameras adapted to create the film sequence; and a screen adapted to depict a stereoscopic image of the computer-generated scene. A script-adjusted near-parallax value and a script-adjusted far-parallax value are calculated.

21 Claims, 9 Drawing Sheets

(56) References Cited

U.S. PATENT DOCUMENTS

| | | | |
|---|---|---|---|
| 2002/0122585 A1* | 9/2002 | Swift et al. | 382/154 |
| 2003/0020708 A1* | 1/2003 | Redert | 345/418 |
| 2006/0098896 A1 | 5/2006 | Pishdadian et al. | |
| 2007/0192722 A1 | 8/2007 | Kokubo | |
| 2010/0039502 A1 | 2/2010 | Robinson | |
| 2011/0169825 A1 | 7/2011 | Ishiyama et al. | |
| 2011/0292045 A1 | 12/2011 | Nakamura et al. | |
| 2012/0056984 A1* | 3/2012 | Zhang et al. | 348/43 |
| 2012/0250152 A1* | 10/2012 | Larson et al. | 359/464 |
| 2012/0262543 A1* | 10/2012 | Lee et al. | 348/43 |
| 2012/0320048 A1 | 12/2012 | Yamashita et al. | |
| 2013/0002666 A1 | 1/2013 | Mihara et al. | |
| 2013/0100254 A1* | 4/2013 | Morioka et al. | 348/47 |
| 2013/0101263 A1* | 4/2013 | Morioka et al. | 386/224 |
| 2013/0120529 A1* | 5/2013 | Nio et al. | 348/43 |
| 2013/0128992 A1* | 5/2013 | Swaminathan et al. | 375/240.26 |
| 2013/0187910 A1* | 7/2013 | Raymond et al. | 345/419 |

OTHER PUBLICATIONS

Non-Final Office Action received for U.S. Appl. No. 13/802,661, mailed on Jan. 23, 2015, 34 pages.

Notice of Allowance received for U.S. Appl. No. 13/802,706, mailed on Feb. 23, 2015, 23 pages.

Notice of Allowance received for U.S. Appl. No. 13/845,701, mailed on Oct. 7, 2014, 10 pages.

Non-Final Office Action received for U.S. Appl. No. 13/802,714, mailed on Mar. 11, 2015, 22 pages.

Adobe Community Help, "Understanding Stereoscopic 3D in After Effects", available online at <https://helpx.adobe.com/after—effects/kb/stereoscopic—3D—effects.html#main_3D_depth_cues_in_After_Effects_>, retrieved on Feb. 04, 2015, Jul. 12, 2011, 11 pages.

Engle, Rob, "Beowulf 3D: A Case Study", Proc. of SPIE—IS&T Electronic Imaging, SPIE vol. 6803, 2008, pp. 68030R—1-68030R—9.

Fehn, Christoph, "3D-TV Using Depth—Image—Based Rendering (DIBR)", Proc. Of VIIP, vol. 3, 2003, 6 pages.

Kim et al., "Depth Adjustment for Stereoscopic Image Using Visual Fatigue Prediction and Depth—Based View Synthesis", IEEE International Conference on Multimedia and Expo (ICME), 2010, pp. 956-961.

Lang et al., "Nonlinear Disparity Mapping for Stereoscopic 3D", ACM Transactions on Graphics, vol. 29, No. 4, Article 75, Jul. 2010, pp. 75:1-75:10.

Lipton, Lenny, "Digital Stereoscopic Cinema: The 21st Century", Proc. of SPIE—IS&T Electronic Imaging, SPIE vol. 6803, 2008, pp. 68030W—1-68030W—7.

Neuman, Robert, "Bolt 3D: A Case Study", SPIE—IS&T, vol. 7237, 2009, pp. 72370E—1-72370E—10.

Song et al., "A Stereoscopic OpenGL—Based Interactive Plug-in Framework for Maya and Beyond", ACM, VRCAI 2009, Yokohama, Japan, Dec. 14-15, 2009, pp. 363-368.

Sun et al., "Evaluating Methods for Controlling Depth Perception in Stereoscopic Cinematography", Proceedings of SPIE, vol. 7237, 2009, 12 pages.

"Stereoscopic Filmmaking Whitepaper: The Business and Technology of Stereoscopic Filmmaking", Autodesk Inc., 2008, 8 pages.

Ware et al., "Dynamic Adjustment of Stereo Display Parameters", IEEE Transactions on Systems, Man and Cybernetics—Part A: Systems and Humans, vol. 28, No. 1, Jan. 1998. 31 pages.

Zilly et al., "The Stereoscopic Analyzer—An Image—Based Assistance Tool for Stereo Shooting and 3D Production", Proceedings of 2010 IEEE 17th International Conference on Image Processing, Sep. 26-29, 2010, pp. 4029-4032.

* cited by examiner

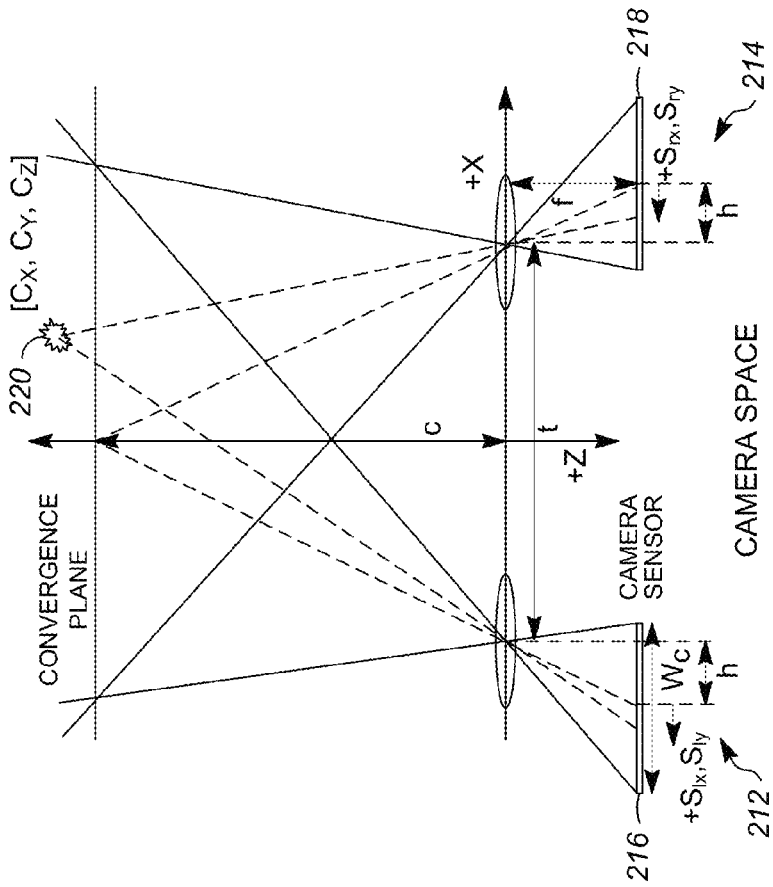
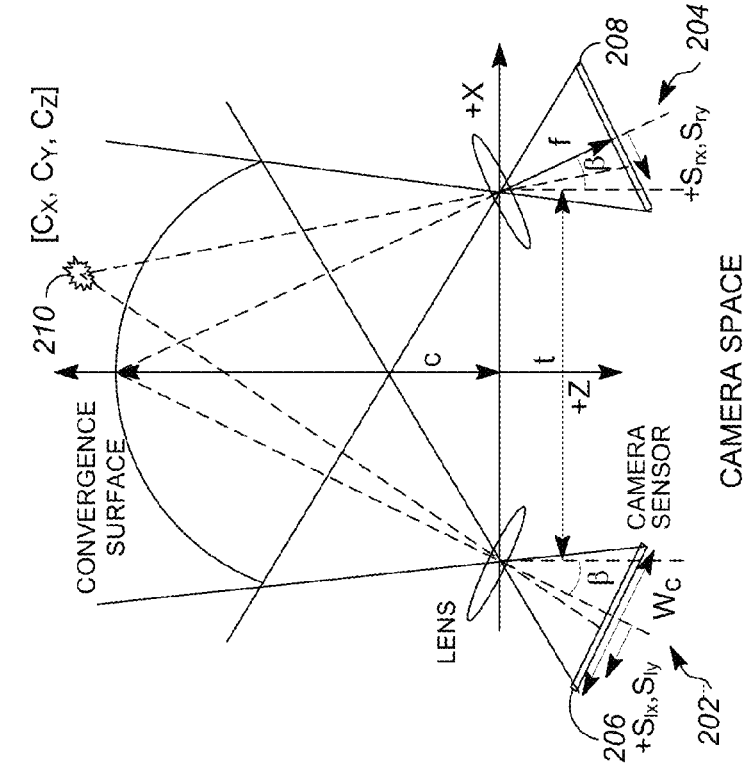
FIG. 2A
FIG. 2B

SCRIPTED STEREO CURVES FOR STEREOSCOPIC COMPUTER ANIMATION

CROSS REFERENCE TO RELATED APPLICATIONS

This application claims the benefit under 35 U.S.C. 119(e) of prior U.S. Provisional Patent Application No. 61/678,568, filed Aug. 1, 2012, which is hereby incorporated by reference in the present disclosure in its entirety.

BACKGROUND

1. Field

The present disclosure relates generally to generating optimized stereo settings for computer animation, and more specifically to calculating scripted bounded-parallax constraints for a computer-generated object in view of a pair of stereoscopic cameras within a computer-generated scene.

2. Related Art

Cinematographic-quality computer animation has evolved to produce increasingly realistic and engaging visual effects. One way that this is accomplished is through the use of stereoscopic filming techniques that simulate human binocular vision by presenting slightly different viewpoints of a scene to a viewer's left and right eye. This technique, also known colloquially as "3D," can be used to enhance the illusion of depth perception and make objects in a computer-generated scene appear to extend outward from a two-dimensional screen.

In normal human binocular vision, each eye views the world from a slightly different perspective. The difference in the view from each eye, also called parallax, is caused, in part, by the spatial separation between the eyes. In general, the amount of parallax is increased for objects that are closer to the viewer as compared to objects that are further from the viewer. The brain is able to combine the different views from each eye and use the parallax between views to perceive the relative depth of real-world objects.

Computer-animation stereoscopic filming techniques take advantage of the brain's ability to judge depth through parallax by presenting separate images to each eye. Each image depicts a computer-generated object from a slightly different viewpoint. The distance between the left and right images displayed on a screen (parallax) indicates the relative depth of the displayed computer-generated object. Parallax can be positive or negative depending on whether the computer-generated object appears to be behind the screen (positive parallax) or if it appears to be in front of the screen (negative parallax).

In the real world, the amount of parallax between a viewer's left and right eyes is determined by two parameters, which are essentially fixed: the spacing between the eyes of the viewer and the distance from the viewer to the object. However, when composing stereo for a computer-animated scene, a filmmaker (e.g., a director or stereographer) can adjust a broader range of stereoscopic parameters (scene parameters) to control the perception of depth in a computer-generated scene. In particular, a filmmaker may be able to adjust scene parameters that determine the camera position, camera separation, camera convergence, and focal length of the lens to increase or decrease the stereo effect (perceived depth of a computer-generated object in a computer-generated scene).

However, providing too much flexibility in the variability of too many scene parameters may make it difficult for the filmmaker to control or optimize the stereo effect for each shot in a computer-animated sequence. In one traditional solution, many of the scene parameters are fixed or only allowed to vary within a range of hard limits. The fixed values or hard limits serve as a rule-of-thumb for filmmakers, but do not guarantee that stereo effect is satisfactory or comfortable to view by an audience. Additionally, limiting the scene parameters to a fixed value or fixed range of values may under-utilize the design space when composing a computer-generated scene. In particular, fixed ranges limit the filmmaker's ability to make trade-offs between the interrelated scene parameters, which may limit the ability to produce dynamic three-dimensional effects.

Another traditional solution is to provide the director or stereographer with direct control over the scene parameters for each scene in a film. This approach also has drawbacks in that it may be difficult to fine tune all of the scene parameters to achieve the desired amount of stereo effect. Too little stereo effect and the objects in the scene will appear flat. Too much stereo effect and the objects may appear distorted or the scene may become uncomfortable to view. Additionally, because this approach relies on manual input, the stereo effect may be inconsistent throughout the film sequence, especially when stereo adjustments are applied to a particular scene but not to others.

What is needed is a technique for consistently achieving an optimal stereo effect without the drawbacks of the traditional approaches discussed above.

SUMMARY

One exemplary embodiment includes a computer-implemented method for determining a user-defined stereo effect for a computer-animated film sequence depicting a computer-generated scene. A timeline of the film sequence is obtained, the timeline comprising a plurality of time entries. A stereo-volume value for at least two time entries of the plurality of time entries is obtained, wherein the stereo-volume value represents a percentage of parallax at the respective time entry. A stereo-shift value for the at least two time entries is obtained, wherein the stereo-shift value represents a distance across one of: an area associated with a sensor of a pair of stereoscopic cameras adapted to capture a stereoscopic image of the computer-generated scene; and a screen adapted to depict the stereoscopic image of the computer-generated scene. A near-parallax value and a far-parallax value are obtained for the at least two time entries. For the at least two time entries, a script-adjusted near-parallax value is calculated based on the stereo-shift value and the product of the stereo-volume and the near-parallax value. Also, for the at least two time entries, a script-adjusted far-parallax value is calculated based on the stereo-shift value and the product of the stereo-volume and the far-parallax value. The script-adjusted near-parallax value and script-adjusted far-parallax values are stored in a computer memory.

In some exemplary embodiments, each camera of the pair of stereoscopic cameras is positioned relative to each other based on the script-adjusted near-parallax value and the script-adjusted far-parallax value. A stereoscopic film sequence of the computer-generated scene is created with the pair of stereoscopic cameras. The stereoscopic film sequence is stored in the computer memory.

In some exemplary embodiments, a camera separation value and a convergence value for the pair of stereoscopic cameras are calculated based on the script-adjusted near-parallax value and the script-adjusted far-parallax value. The camera separation value and the convergence value are stored in the computer memory. Each camera of the pair of stereoscopic cameras may be positioned relative to each other within the computer-generated scene based on the camera separation value and the convergence value. Additionally, a camera sensor of the pair of stereoscopic cameras may be positioned within the computer-generated scene based on the camera separation value and the convergence value.

In some embodiments, the plurality of time entries correspond to a sequence of image frames in an animated film sequence. In some embodiments, the stereo-volume values and the stereo-shift values are obtained from a stereo script curve that defines the values for the timeline of the film sequence. The stereo-volume value may be specified as a percentage value such that values greater than 100 percent correspond to an amplification of a stereo effect and values less than 100 percent correspond an attenuation of the stereo effect.

DESCRIPTION OF THE FIGURES

FIGS. 2A and 2B depict exemplary configurations for stereoscopically filming a computer-generated scene.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
FIG. 1 depicts a stereoscopically filmed, computer-generated scene.

FIG. 1 depicts a stereoscopically filmed, computer-generated scene. The scene depicts two animated characters viewed in profile. For purposes of this discussion, each animated character is treated as a single computer-generated object. The image depicted in FIG. 1 is a composite of two views of the computer-generated scene: one view from a left camera and one view from a right camera. The left and right camera views can be used to produce a stereoscopic image of the computer-generated scene. In a typical case, the cameras used to produce the left and right views are offset a distance that corresponds to an estimated distance between the viewer's eyes (approximately 65 mm).

The image in FIG. 1 appears slightly blurred because the animated characters (exemplary computer-generated objects) are viewed from the slightly different positions of the left and right camera. However, when the image is viewed with appropriate stereoscopic equipment, the left-camera view is presented to the viewer's left eye in isolation and the right-camera view is presented to the viewer's right eye in isolation. This can be achieved using a number of techniques that are known in the art, including, for example, use of stereoscopic glasses. Using these known techniques, the left-camera view is separately presented to the left eye using polarized or color-coded light that corresponds to a polarized or color-coded left lens of the stereoscopic glasses. Similarly, the right-camera view is separately presented to the right eye using polarized or color-coded light that is distinguishable from the left-camera view.

The viewer is able to mentally and visually combine the left-camera and right-camera view into a composite image that includes a certain degree of parallax for one or more computer-generated objects. The greater the parallax, the closer/farther the computer-generated object appears to the viewer (with respect to the display screen). As discussed above, a filmmaker can use this stereo effect to make computer-generated objects appear to have depth even though they are displayed on what is essentially a two-dimensional display screen.

To create a stereoscopic film sequence, the computer-generated scene can be animated using traditional computer-animation techniques and the scene can be stereoscopically filmed. The resulting stereoscopic film sequence comprises a series of image frames, each image frame representing the computer-generated scene at a point in time. When the series of image frames are presented to a viewer, the computer-generated scene can be made to depict a live action scene appearing to have depth due to the stereoscopic effect of the filming technique.

1. Filming and Viewing a Stereoscopic Computer-Generated Scene

FIGS. 2A and 2B depict exemplary optical configurations of a stereoscopically filmed computer-generated scene in camera space. The configurations include a left camera (202, 212) and a right camera (204, 214) that are capable of viewing a point (210, 220) on an object in a computer-generated scene. FIGS. 2A and 2B depict alternative configurations for positioning the cameras when filming the computer-generated scene. FIG. 2A depicts a converged camera configuration with the cameras 202 and 204 pointed inward at an angle β and converging along a curved convergence surface. FIG. 2B depicts an alternative configuration with cameras 212 and 214 pointed in a parallel direction and having sensors (216, 218) offset from the center of their respective lens at a distance h. In FIG. 2B, the parallel cameras 212 and 214 converge along a convergence plane. Either of the camera configurations shown in FIG. 2A or 2B can be used to stereoscopically film a computer-generated scene.

With reference to FIG. 2A, the left and right cameras (202, 204) each record a different image of the computer generated scene, which includes point 210. The left camera 202 records an image of the point 210 at left-image location ($S_{lx}$, $S_{ly}$) using the left camera sensor 206. Similarly, the right camera 202 records an image of the point 210 at right-image location ($S_{rx}$, $S_{ry}$) using the right camera sensor 208. The difference between the left-image location ($S_{lx}$, $S_{ly}$) and the right-image location ($S_{rx}$, $S_{ry}$) indicates the amount of parallax for point 210. Similarly, with reference to FIG. 2B, the left and right cameras (212, 214) each record a different image of the point 220 at left-image location ($S_{lx}$, $S_{ly}$) for left sensor 216 and the right-image location ($S_{rx}$, $S_{ry}$) for right sensor 218.

FIGS. 2A and 2B also depict several scene parameters that have an impact on how computer-generated objects or points in the computer-generated scene will be perceived by the viewer. The three-dimensional scene coordinate ($C_x$, $C_y$, $C_z$) describes the location of the point 210 within the computer-generated scene. Convergence distance c is the distance from the lenses and the convergence surface or convergence plane. The convergence surface/plane corresponds to the location of points that will have zero parallax between the left and right images. Also, points located further away from the convergence surface/plane will have greater parallax than those points that are closer to the convergence surface/plane. The camera separation t represents the distance between optical nodes of the left and right cameras, and may also have an impact on the amount of parallax. The left and right cameras also have sensor width $W_c$ and a focal length f from the sensor to the lens.

Figure 2C:
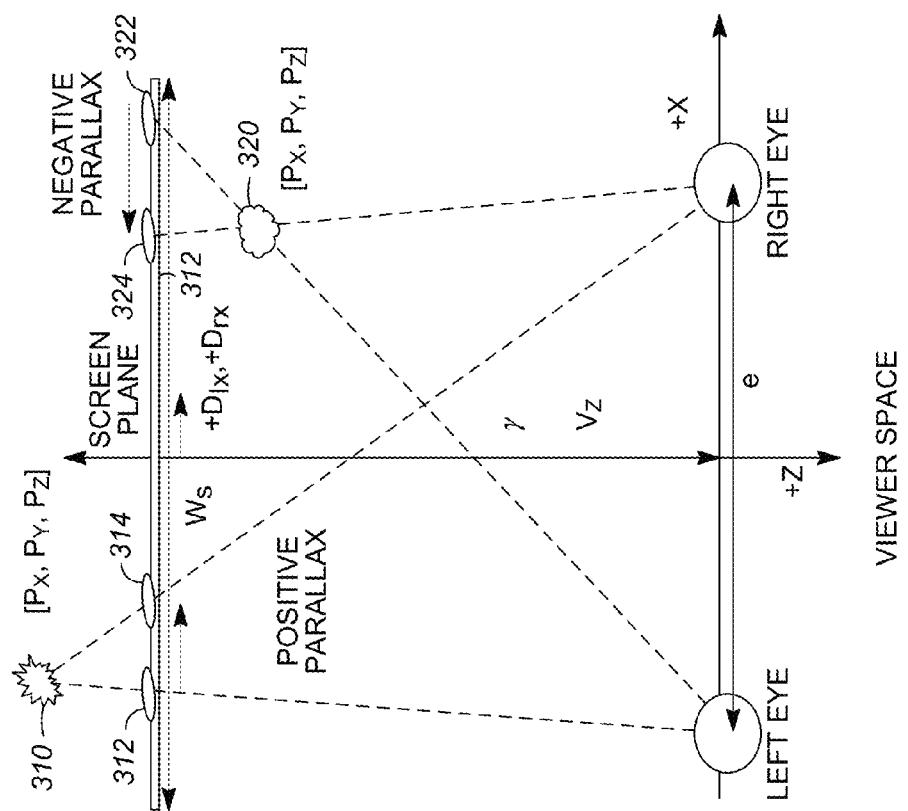
FIG. 2C depicts an exemplary configuration for displaying a stereoscopically filmed scene.

FIG. 2C depicts an exemplary configuration of a stereoscopically filmed computer-generated scene in viewer space. In general, viewer space represents how a stereoscopically filmed, computer-generated scene may be perceived by a modeled viewer located a specified distance from a modeled screen. As shown in FIG. 2C, the modeled viewer has an inter-ocular distance e and is positioned a distance $V_z$ from the modeled screen having a screen width $W_s$. FIG. 2C depicts how left and right views, each presented to the modeled viewer's left and right eye respectively, result in eye convergence that simulates the points as being out of plane from the screen. Specifically, FIG. 2C depicts perceived point 310 that appears to be behind the screen plane, and perceived point 320 that appears to be in front of the screen plane.

Perceived point 310 is represented by left-camera image 312 and right-camera image 314. Because the left-camera image 312 is to the left of right-camera image 314, the perceived point 310 is said to have positive parallax and will appear to the viewer to have a depth that is greater than the distance from the viewer to the screen $V_z$. In other words, to the viewer, the perceived point 310 will appear to exist behind the screen plane.

Similarly, perceived point 320 is represented by left-camera image 322 and right-camera image 324. Because the left-camera image 322 is to the right of right-camera image 324, the perceived point 320 is said to have negative parallax and will appear to the viewer to have a depth that is less than the distance from the viewer to the screen $V_z$. In other words, to the viewer, the perceived point 320 will appear to exist in front of the screen plane.

One technique for simplifying the stereo configuration is to describe a set of bounded-parallax constraints. A set of bounded-parallax constraints typically includes a far-parallax value, a near-parallax value, a near distance, a far distance, and a focal length. The far-parallax value is the maximum positive parallax for the computer-generated scene and is typically expressed in terms of pixels or a percentage of screen width. Similarly, the near-parallax value is the minimum negative parallax for the computer-generated scene and is also typically expressed in terms of pixels or a percentage of screen width. The near distance and far distance are the near and far limits of where computer-generated objects may be placed within the computer-generated scene. Focal length is the focal length of the pair of stereoscopic cameras and is depicted as f in FIGS. 2A and 2B, above.

The amount of stereo effect perceived by the viewer can be controlled by manipulating the bounded-parallax constraints or the other scene parameters discussed above with respect to FIGS. 2A and 2B. Ideally, the scene parameters (e.g., the bounded-parallax constraints) are set to produce an optimum stereo effect for at least one of the computer-generated objects in the scene. However, because the composition of a computer-generated scene can vary and the desired amount of stereo effect may vary, the scene parameters and the optimal parameter settings may also vary over the course of computer-animated film sequence. As previously mentioned, one solution is to manually adjust the scene parameters to suit the requirements for each scene. However, this approach typically requires the direct involvement of a skilled director or stereographer to ensure that the settings are appropriate. Even then, it may be difficult to maintain consistency across scenes in a film or across films produced from the same studio.

Therefore, it is generally desirable to automate at least a portion of the scene parameter setting process while still providing the filmmaker with creative control, when necessary. The system and techniques discussed below can be used to determine optimal scene parameter settings and position the stereoscopic cameras within the scene to obtain an optimized and consistent stereo effect.

2. Setting Baseline Scene Parameters

Figure 3:
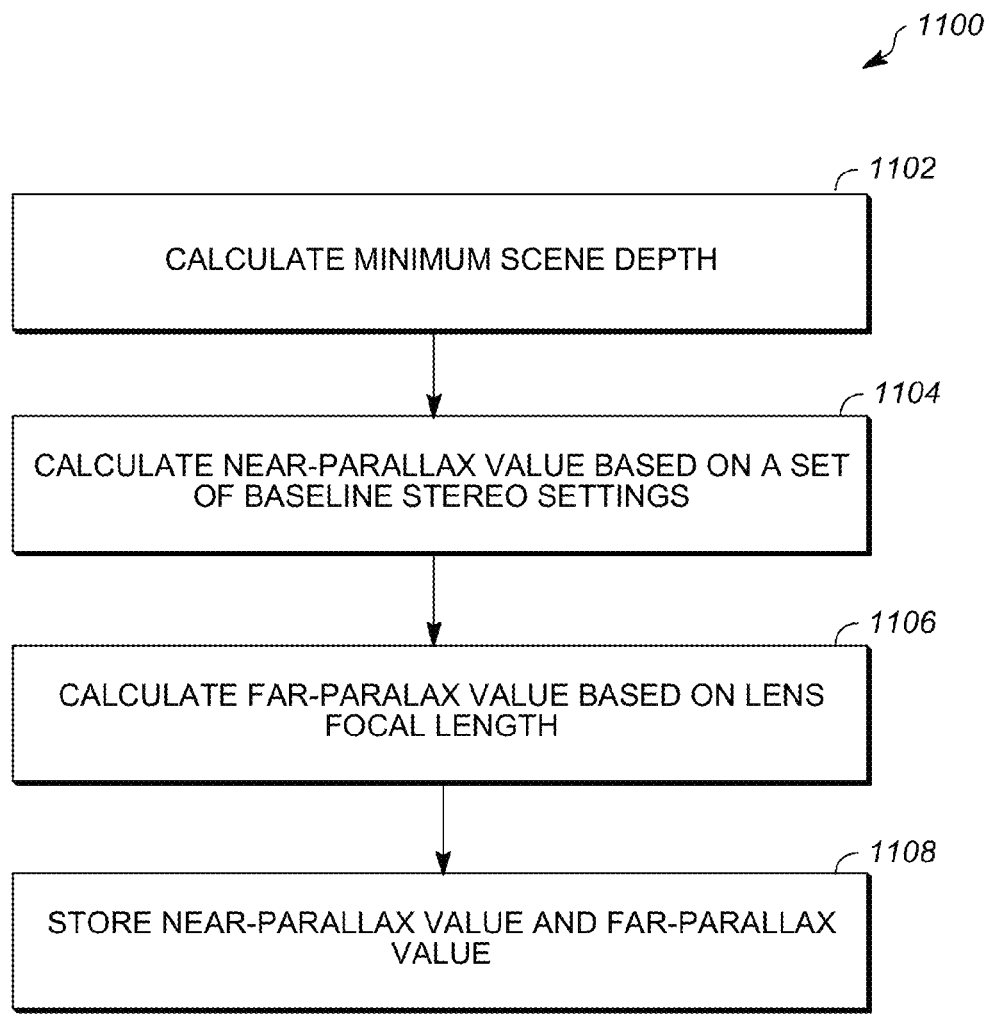
FIG. 3 depicts an exemplary process for determining a set of scene parameters using baseline stereo settings.

FIG. 3 depicts a flow chart of an exemplary process 1100 for determining the bounded-parallax constraints for the placement for a pair of stereoscopic cameras in a computer-generated scene using baseline stereo settings. In general, process 1100 can be used to determine acceptable stereo settings for a particular computer-generated scene based on one or more tables of baseline stereo settings. The one or more tables of baseline stereo settings are typically formulated in advance and include groupings of stereo parameters (stereo setting entries) that are known to produce an acceptable stereo effect for a particular scene layout. In some cases, the one or more tables of baseline stereo settings are manually created by a stereographer or director having skill in configuring stereo settings for a scene.

For purposes of the following discussion, it is assumed that a computer-generated scene includes at least one computer-generated object, which is in view of at least one camera of a pair of stereoscopic cameras. For process 1100, reference is made to FIG. 4, which depicts an exemplary computer-generated scene 400 with two animated characters (450, 452) (exemplary computer-generated objects) in view of a pair of stereoscopic cameras (402, 404). Each camera has a camera sensor (406, 408) positioned (centered or offset) with respect to a lens having a focal length f. The field of view of the stereoscopic cameras is determined, in part, by the focal length f of the camera lenses and defines the visual boundaries of the computer-generated scene.

With reference to FIG. 3, in operation 1102, the minimum scene depth is calculated. In the following example, the minimum scene depth is based on the distance from the cameras to the nearest point of interest in a computer-generated scene. For a computer-generated scene having a single computer-generated object, the nearest point of interest may be the point on the computer-generated object that is closest to the camera.

Figure 4:
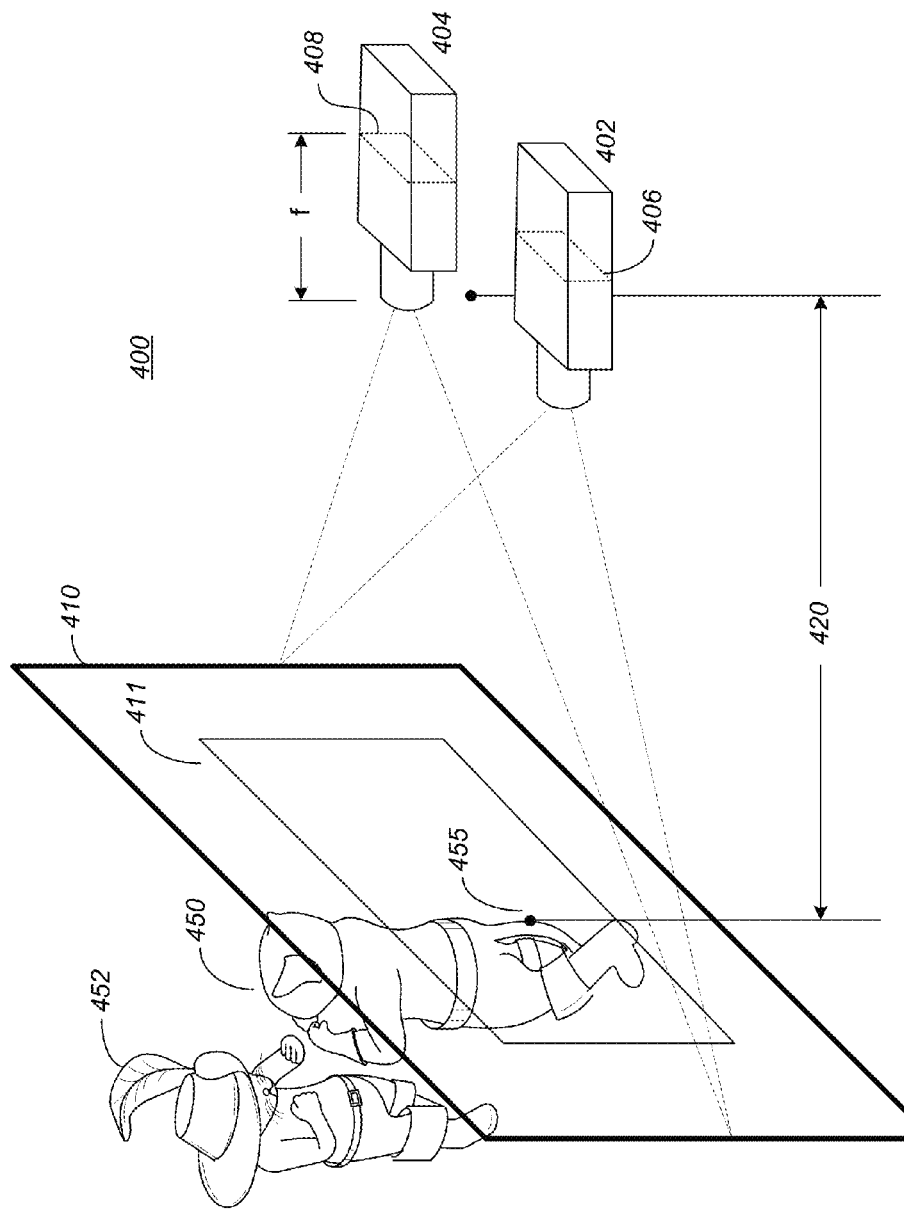
FIG. 4 depicts an exemplary computer-animated scene filmed by a pair of stereoscopic cameras.

FIG. 4 depicts an exemplary configuration for a computer-generated scene 400 having two computer-animated characters (450, 452) positioned with respect to cameras (402, 404). Distance 420 represents the distance from the pair of cameras (402, 404) to the nearest point 455 on the nearest animated character in the scene 400. In this example, distance 420 is measured from the midpoint between the pair of cameras (402, 404) to a point 455 on the nearest animated character 450. Other points related to the location of the pair of cameras (402, 404), including, for example, the location of the camera sensors (406, 408) or the location of the lenses, could also be used as reference points for the distance to the nearest point 455.

In general, to produce a satisfactory stereo effect over a series of images in a film sequence using process 1100, it is advantageous to select a point of interest that is both associated with a subject of a viewer's attention and will remain relatively consistent across the series of images. If a consistent point of interest is not selected over a series of images, the camera placement may appear erratic or jumpy.

A number of techniques can be used to determine the nearest point of interest that satisfied these criteria. In one example, the nearest point of interest in a computer-generated scene can be determined by scanning or sampling the computer-generated scene over a projected area associated with a middle portion of the camera sensor.

With reference to FIG. 4, the projected area associated with a middle portion of the sensor can be determined based on the field of view of the pair of stereoscopic cameras. As depicted in FIG. 4, the pair of camera sensors (406, 408) is associated with a primary projected area 410 defined, in part, by the field of view of the pair of cameras (402, 404). The primary projected area 410 roughly corresponds to the complete image that will be captured by the cameras and presented to the viewer. The primary projected area 410 typically includes transient objects like brush, leaves, and the ground effects that may change over the film sequence. Thus, in some cases, selecting a nearest point of interest based on the location of these transient objects may produce a minimum scene depth that changes rapidly and results in a jumpy stereo effect. These transient objects are also typically located near the periphery of the primary projected area 410 and are also not likely to be subject of the viewer's attention. For example, the transient objects may include objects on the ground or foliage that surrounds the primary subjects on the scene.

To address this problem, a second projected area associated with the middle portion of the camera sensor can be used to determine the minimum scene depth. As shown in FIG. 4, a secondary projected area 411 associated with a middle portion of the pair of camera sensors is defined. The secondary projected area 411 typically includes the subject of the viewer's attention and excludes many of the transient objects included in the periphery of the primary projected area 410. The size of the secondary projected area 411 can be determined in order to produce minimum scene depth that will be consistent across the film sequence and will also correspond to the subject of the viewer's attention. In the example depicted in FIG. 4, the size of the secondary projected area 411 is approximately ⅔ of the field of view of the pair of cameras (or approximately ⅔ of the size of the primary projected area 410). In other cases, the secondary projected area 411 may be, for example, approximately ¾, ½, ¼, or any other fractional size of the field of view of the pair of cameras.

The secondary projected area 411 may be scanned or sampled for the nearest point of interest. In one example, a depth array of depth pixels is defined over the secondary projected area 411. Each depth pixel is associated with a depth value representing, for example, a distance from the pair of cameras to the nearest intersecting object in the scene as measured along an imaginary line that originates at one or more camera sensor pixels and passes through the corresponding depth pixel in the depth array. If an intersecting object is not present for the depth pixel, the depth value may be empty or zero. Using a depth array, a scanning algorithm may be implemented that finds the lowest non-zero or non-empty depth value in the depth array and stores that value as the nearest point of interest. Alternatively, a sampling algorithm may be implemented that selects a subset of the depth pixels in the depth array, finds the lowest non-zero or non-empty depth value, and stores that value as the nearest point of interest.

In another example, one or more computer-generated objects may be tagged as important for the scene. For example, an animated character may be manually tagged by the filmmaker as important because the animated character is the subject of the scene or film sequence. In this embodiment, the nearest point on the nearest tagged computer-generated object with respect to the pair of cameras is used as the nearest point of interest.

With reference again to FIG. 3, in operation 1104, a near-parallax value (or near shift ns) is calculated based on a set of baseline stereo settings. As previously mentioned, the near-parallax value typically represents the maximum negative parallax between left and right views of a computer-generated object in the scene. The set of baseline stereo settings includes multiple stereo-setting entries of setting parameter values that are known to produce a satisfactory stereo effect. Specifically, each stereo-setting entry specifies a recommended scene depth, a recommended focal length, and a recommended near-parallax value. The multiple stereo-setting entries may be determined in advance and stored in a database or series of tables. As previously mentioned, the stereo-setting entries may be manually created in advance by a stereographer or director having skill in configuring stereo settings for a scene.

In the present embodiment, the near-parallax value is calculated by selecting a stereo-setting entry having a recommended scene depth that corresponds to the minimum scene depth (determined in operation 1102) and having a recommended focal length that corresponds to the focal length of the pair of cameras. The near-parallax value is calculated based on the recommended near-parallax value of the selected stereo-setting entry.

In general, the set of baseline stereo settings is stored to facilitate the selection of a stereo-setting entry given two of the three recommended values. In an exemplary storage configuration, pairs of recommended near-parallax values and associated recommended scene depths are stored in a table of stereo-setting entries. Multiple tables of stereo-setting entries are created, each table associated with a recommended focal length. Using this storage configuration, a table associated with a recommended focal length can be selected based on the focal length of the pair of cameras. Within the selected table, a stereo-setting entry having a recommended scene depth that corresponds to the minimum scene depth (determined in operation 1102) can be selected. The near-parallax value can then be determined based on the recommended near-parallax value of the selected stereo-setting entry.

In many cases, the selected table will not have a recommended scene depth that exactly matches the minimum scene depth. In this case, two or more stereo-setting entries may be selected and the near-parallax value can be determined by interpolating between two or more parameter values associated with the selected stereo-setting entries. Similarly, when the focal length of the cameras falls between recommended focal lengths associated with the tables of entries, recommended parameter values from multiple focal length tables can be used to interpolate the near-parallax value.

In this way, if the minimum scene depth and focal length of the cameras are known, a precise value for the near-parallax value can be calculated. In the present embodiment, the set of baseline stereo settings includes recommended focal lengths ranging from 14 mm to 200 mm and recommended scene depths ranging from 0.4 to 100,000 length units.

Typically, the selection and interpolation of stereo-setting entries are performed by a single function call that takes the focal length and minimum scene depth as inputs and returns a near-parallax value. Equation 1, below, depicts an exemplary function "StereoLUT" that performs these functions.

$$ns = \text{stereoLUT}(nd, f), \quad (1)$$

where nd is the minimum scene depth (determined in operation 1102), f is the focal length of the pair of cameras, and ns is the near-parallax value (or near shift).

In operation 1106, a far-parallax value is calculated based on the focal length of the lenses of the pair of cameras. The far-parallax value typically represents the maximum positive parallax between left and right views of a computer-generated object in the scene. In the present embodiment, the far-parallax value is based on the focal length of the pair of cameras. Equation 2 below depicts an exemplary relationship between the far-parallax value and focal length.

$$fs = K * f, \quad (2)$$

where fs is the far-parallax value (or far shift), f is the focal length of the pair of cameras, and K is a scalar value. In the present embodiment, K is 1.0, resulting in a far-parallax value that equals the focal length of the pair of cameras.

In operation 1108, the near-parallax value and far-parallax value are stored. The values are typically stored and associated with the other bounded-parallax constraints (e.g., near distance, far distance, and focal length) that specify the stereo settings for an image or frame in a film sequence. The values may be stored, for example, on a non-transitory computer-readable storage medium, such as a computer storage disk. Other computer storage examples are provided below and discussed with respect to FIG. 8.

The near-parallax and far-parallax values can be used to calculate other stereoscopic parameters for the computer-generated scene. For example, a camera separation value and a convergence value can be calculated for the pair of cameras based on the far-parallax value and the near-parallax value. Equation 3, below, depicts an exemplary technique for calculating a camera separation value t using far-parallax and near-parallax values.

$$t = \frac{nd * fs * fd - fd * ns * nd}{fd - nd} * \frac{W_c}{f * R_c}, \quad (3)$$

where $W_c$ is the camera sensor width, $R_c$ is the resolution of the camera sensor, nd is the minimum scene depth (near distance), fs is the far-parallax (far shift), fd is the maximum scene depth (far distance), and ns is the near-parallax (near shift).

Equation 4, below, depicts an exemplary technique for calculating a convergence distance value c using far-parallax and near-parallax values.

$$c = \frac{nd * fs * fd - fd * ns * nd}{fd * fs - nd * ns}. \quad (4)$$

The camera separation value and a convergence distance value may also be stored, for example, on a non-transitory computer-readable storage medium, such as a computer storage disk. Other computer storage examples are provided below and discussed with respect to FIG. 8.

The camera separation value t and the convergence distance value c may be used to position the pair of stereoscopic cameras in the computer-generated scene. For example, as discussed above, FIG. 2A depicts a converged camera configuration with the cameras 202 and 204 separated by a distance t and pointed inward at an angle β and converging along a curved convergence surface that is a convergence distance c from the cameras. FIG. 2B depicts an alternative configuration with cameras 212 and 214 also separated a distance t and pointed in a parallel direction. In FIG. 2B, the camera sensors (216, 218) are offset from the center of their respective lens at a distance h and the parallel cameras 212 and 214 converge along a convergence plane that is a convergence distance c from the cameras. The convergence principles shown in FIGS. 2A and 2B can also be combined to produce a convergence configuration with the cameras both pointed inward at an angle β and having sensors offset a distance h. Equations 5 and 6, below, demonstrate the relationship between the convergence value c and parameters that directly specify the position of the pair of stereoscopic cameras.

$$h = 2f \tan\left(\arctan\left(\frac{t}{2c}\right) - \beta\right), \quad (5)$$

and $$\beta = \arctan\left(\frac{t}{2c}\right) - \arctan\left(\frac{h}{2f}\right), \quad (6)$$

where f is the focal length of the pair of cameras, t is the camera separation value, and c is the convergence distance value. Thus, using the camera separation value t and the convergence distance value c, the pair of stereoscopic cameras can be positioned within a computer-generated scene.

Using the new placement of the pair of stereoscopic cameras, a stereoscopic image of the computer-generated scene can be captured by the camera sensors. The image may be saved as a single image, or associated with a frame or time entry in an animated film sequence. Typically, a series of stereoscopic images are captured as the computer-generated objects in the computer-generated scene are manipulated to produce a computer animation sequence.

The bounded-parallax constraints calculated using process 1100, discussed above, may remain the same throughout a given computer animation sequence. However, in some cases, the bounded-parallax constraints or the placement for a pair of stereoscopic cameras may change one or more times during the computer animation sequence. For example, if the objects in the computer generated scene move toward or away from the pair of stereoscopic cameras, the distance to the nearest point in the scene may change (e.g. point 455 in FIG. 4). In some cases, it may be beneficial to recalculate the bounded-parallax constraints based on an updated distance to the nearest point by repeating process 1100. Similarly, bounded-parallax constraints may be re-calculated for a changing focal length. For example, the focal length may change due to changes in the settings of a zoom lens.

As discussed above, the stereoscopic image or images (produced using bounded-parallax constraints calculated with process 1100) can be displayed to a viewer using known stereoscopic techniques to produce a scene appearing to have depth in and out of the screen. For example, the stereoscopic image may be displayed to a viewer who is viewing the image through stereo glasses.

Process 1100 can be combined with other automated processes for producing or refining scene parameters for a stereoscopically filmed scene. For example, U.S. Provisional Application No. 61/678,568 describes exemplary processes for calculating scaled parallax constraints, creative control of parallax constraints, scripted parallax constraints, and other parameters that can be combined with process 1100, described above. Combining multiple processes may produce stereo settings that result in an optimal stereo effect and are more consistent across a film sequence, as compared to traditional manual stereo-setting techniques.

3. Adjusting Scene Parameters Based on Stereo Volume and Stereo Shift

Process 1100, described above, is drawn to an automated technique for setting the amount of stereo for a particular shot. In some cases, it is also desirable to provide the filmmaker with creative control over the amount of stereo for a particular shot. That is, for one or more images of a computer-generated scene, the amount of stereo may need to be boosted (amplified) or crushed (attenuated) to achieve the desired stereo effect. Additionally, the filmmaker may want to shift the convergence distance (point of zero parallax) forward or backward to emphasize or deemphasize certain aspects of the scene.

One solution is for the filmmaker to directly manipulate the scene parameters used to specify the location of the pair of stereoscopic cameras within the scene. For example, by adjusting the camera separation, camera sensor offset, distance to the objects, and convergence angle, the filmmaker can effect changes in the amount of stereo. However, the relationship between various scene parameters may be complex and, therefore, it may be difficult for the filmmaker to directly manipulate the parameter values to achieve a particular stereo effect.

Figure 5:
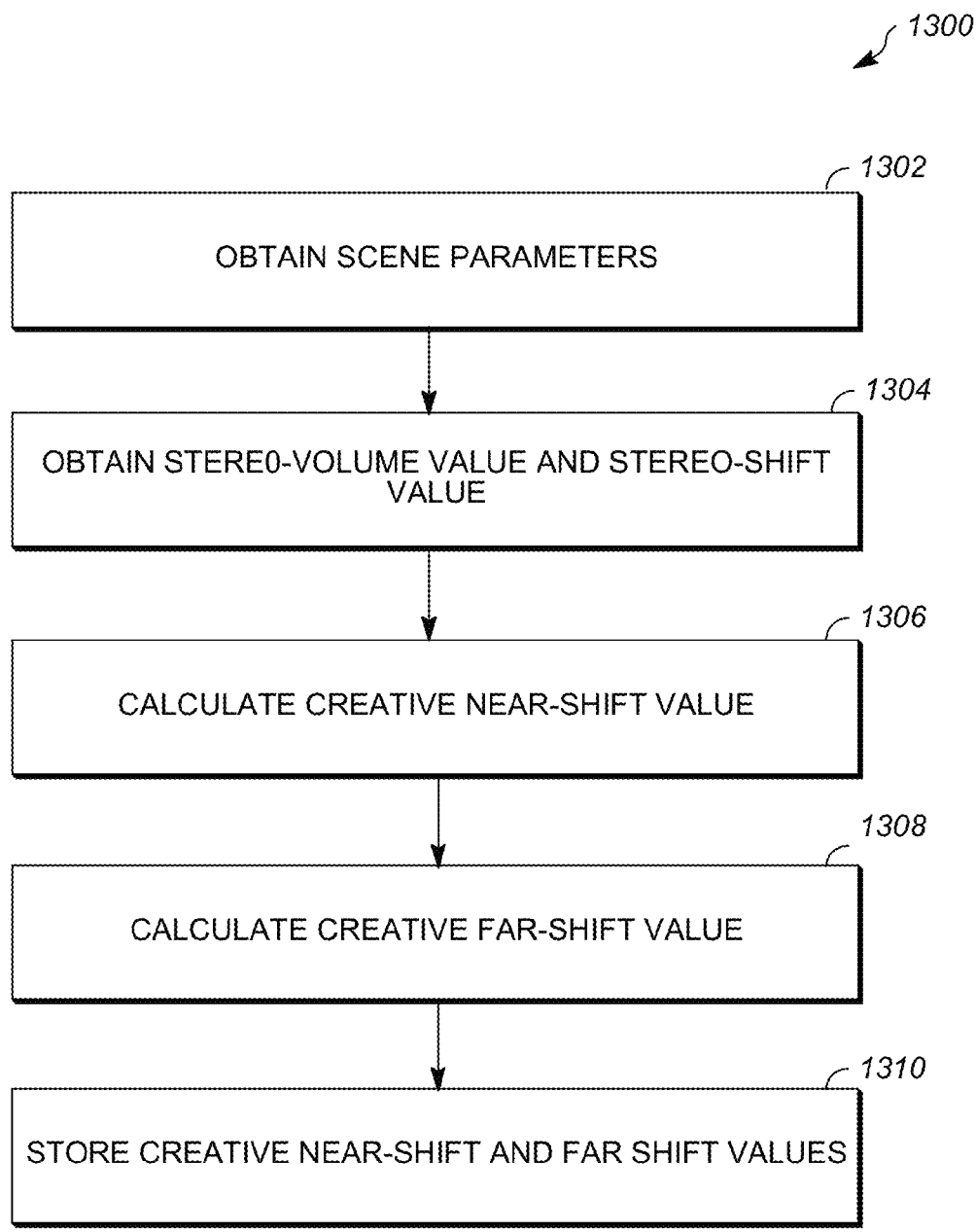
FIG. 5 depicts an exemplary process for adjusting a set of scene parameters based on a user's selection of stereo volume and stereo shift.

Another solution is to specify changes to an existing stereo configuration in terms of a stereo volume and stereo shift, as described below with respect to FIG. 5. In particular, FIG. 5 depicts an exemplary process 1300, for determining creative parallax constraints for a computer-generated scene based on user-specified stereo-volume and stereo-shift values. Process 1300 can be used to creatively control the amount of stereo for a given shot without requiring that the filmmaker manually manipulate the position of the cameras.

With respect to FIG. 5, in operation 1302, scene parameters for a computer-generated scene are obtained. The scene parameters may include, for example, two bounded-parallax constraints: a near-parallax value and a far-parallax value. These values may be obtained from computer memory or they may be obtained as an output of another process. As discussed above, process 1100 can be used to obtain near-parallax and far-parallax values.

Alternatively, the near-parallax and far-parallax values may be obtained based on an existing computer-generated scene configuration having a pair of stereoscopic cameras placed with respect to one or more computer-generated objects. As discussed above with respect to FIGS. 2A and 2B, scene parameters, namely, camera separation t, convergence distance c, focal length f, and sensor width $W_c$, can be used to describe the stereoscopic configuration of a computer-generated scene. Equations 7 and 8, below, can be used to calculate the near-parallax value ns and far-parallax value fs given a set of other scene parameters.

$$ns = \left(\frac{fR_c}{W_c}\right)\left(\frac{t}{c} - \frac{t}{nd}\right),\tag{7}$$

and $$fs = \left(\frac{fR_c}{W_c}\right)\left(\frac{t}{c} - \frac{t}{fd}\right),\tag{8}$$

where f is the focal length of the pair of cameras, $R_c$ is the resolution of the camera sensors, $W_c$ is the width of the camera sensors, t is the camera separation, c is the convergence distance, nd is the minimum scene depth, and fd is the maximum scene depth.

With reference again to FIG. 5, in operation 1304, a stereo-volume value V and a stereo-shift value S are obtained from the user. These values may be obtained from a user using an input device, such as a computer keyboard or other computer input hardware device. Exemplary computer input devices are described below with respect to computer system 2000 in FIG. 8. Typically, the stereo-volume value V is expressed as a percentage of parallax. A stereo-volume value less than 100 percent is typically associated with an attenuation of the stereo effect. Similarly, a stereo-volume value greater than 100 percent is typically associated with an amplification of the stereo effect. The stereo-shift value S is expressed in terms of a distance normalized by the width or resolution of the screen. For example, the stereo-shift S may be expressed in terms of a number of pixels, where the number of pixels represents the distance across the screen or camera sensor. A positive stereo-shift value is typically associated with movement of the convergence plane toward from the pair of stereoscopic cameras and a negative value is typically associated with a movement of the convergence plane away from the pair of stereoscopic cameras.

In operations 1306 and 1308, creative scene parameters are calculated using the stereo-volume value V and the stereo-shift value S obtained as user input. Equations 9 and 10, below, depict an exemplary approach for calculating a creative near-parallax value ns_creative and creative far-parallax value fs_creative based on the stereo-volume value V and the stereo-shift value S.

$$\text{ns\_creative} = (ns*V) + S, \text{ and} \tag{9}$$

$$\text{fs\_creative} = (fs*V) + S, \tag{10}$$

where ns is the near-parallax value obtained in operation 1302, fs is the far-parallax value obtained in operation 1302, V is the stereo-volume value obtained in operation 1304, and S is the stereo-shift value obtained in operation 1304.

As previously discussed, a stereo-volume value greater than 100 percent will increase both the near-parallax and far-parallax values, resulting in an amplified or boosted stereo effect. A stereo-volume value less than 100 percent will decrease both the near-parallax and far-parallax values, resulting in an attenuated or crushed stereo effect. The stereo-shift value will move the stereo effect toward or away from the pair of stereoscopic cameras. A positive stereo-shift value is associated with a movement of the convergence plane toward the cameras and will tend to make stereoscopically displayed computer-generated objects appear to have greater stereo effect into the display screen. Similarly, a negative stereo-shift value is associated with a movement of the convergence plane away from the cameras and typically results in a greater stereo effect out of the display screen.

In operation 1310, the creative near-parallax and far-parallax values are stored in computer memory. The creative near-parallax and creative far-parallax values may be stored, for example, on a non-transitory computer-readable storage medium, such as a computer storage disk. Other computer storage examples are provided below and discussed with respect to FIG. 8.

In addition, the creative near-parallax and far-parallax values can also be used to calculate other stereoscopic parameters for the computer-generated scene. For example, equations 3 and 4, discussed above, can be used to calculate a camera separation value and a convergence value for the pair of cameras based on the creative near-parallax and far-parallax values.

As previously discussed, the camera separation value t and the convergence distance value c may be used to position the pair of stereoscopic cameras in the computer-generated scene. Specifically, equations 5 and 6, discussed above, demonstrate the relationship between the convergence value c and parameters that directly specify the position of the pair of stereoscopic cameras. Thus, stereo volume and stereo shift can be used to determine a camera separation value t and the convergence distance value c, which can be used to position the pair of stereoscopic cameras within a computer-generated scene.

Using the new placement of the pair of stereoscopic cameras, a stereoscopic image of the computer-generated scene can be captured by the camera sensors. The image may be saved as a single image or associated with a frame in an animated film sequence. As discussed above, the stereoscopic image can be displayed to a viewer using known stereoscopic techniques (e.g., stereo glasses) to produce a scene appearing to have depth in and out of the screen.

4. Adjusting Scene Parameters Based on a Stereo Depth Script

As previously discussed, a computer-animated film sequence can be created by animating a computer-generated scene and stereoscopically filming the animated scene using a pair of stereoscopic cameras. The resulting stereoscopic film sequence comprises a series of image frames, each image frame representing the computer-generated scene along a film-sequence timeline.

Figure 7:
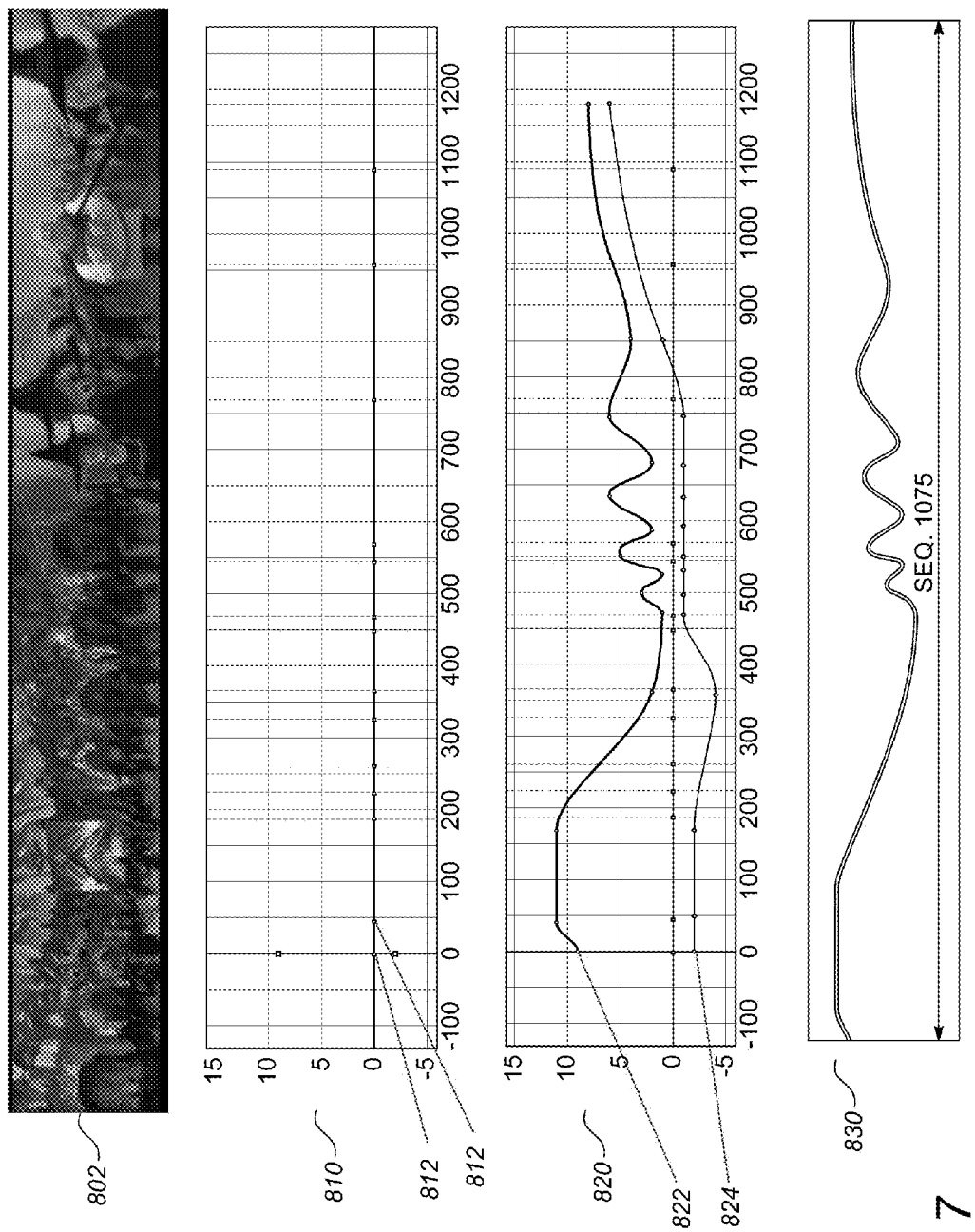
FIG. 7 depicts a graphical representation of an exemplary stereo depth script.

FIG. 7 depicts a composite image 802 that represents a film sequence as a computer-animated scene changes over time. Below the composite image 802, FIG. 7 depicts a graphical representation of a film-sequence timeline 810 having a plurality of time entries 812. Each time entry represents a moment in time and is associated with corresponding image frame in the film sequence. Each time entry is also associated with a set of scene parameters that specify, inter alia, the placement of the stereoscopic cameras within the scene, and thus determines the stereo effect for the film sequence.

The stereo effect can be modified over time based on a stereo script 820 that specifies a stereo-volume curve 822 and a stereo-shift curve 824 that corresponds to the film-sequence timeline 810. As discussed above, stereo volume and stereo shift can be used to amplify or attenuate the amount of stereo in a particular shot.

Figure 6:
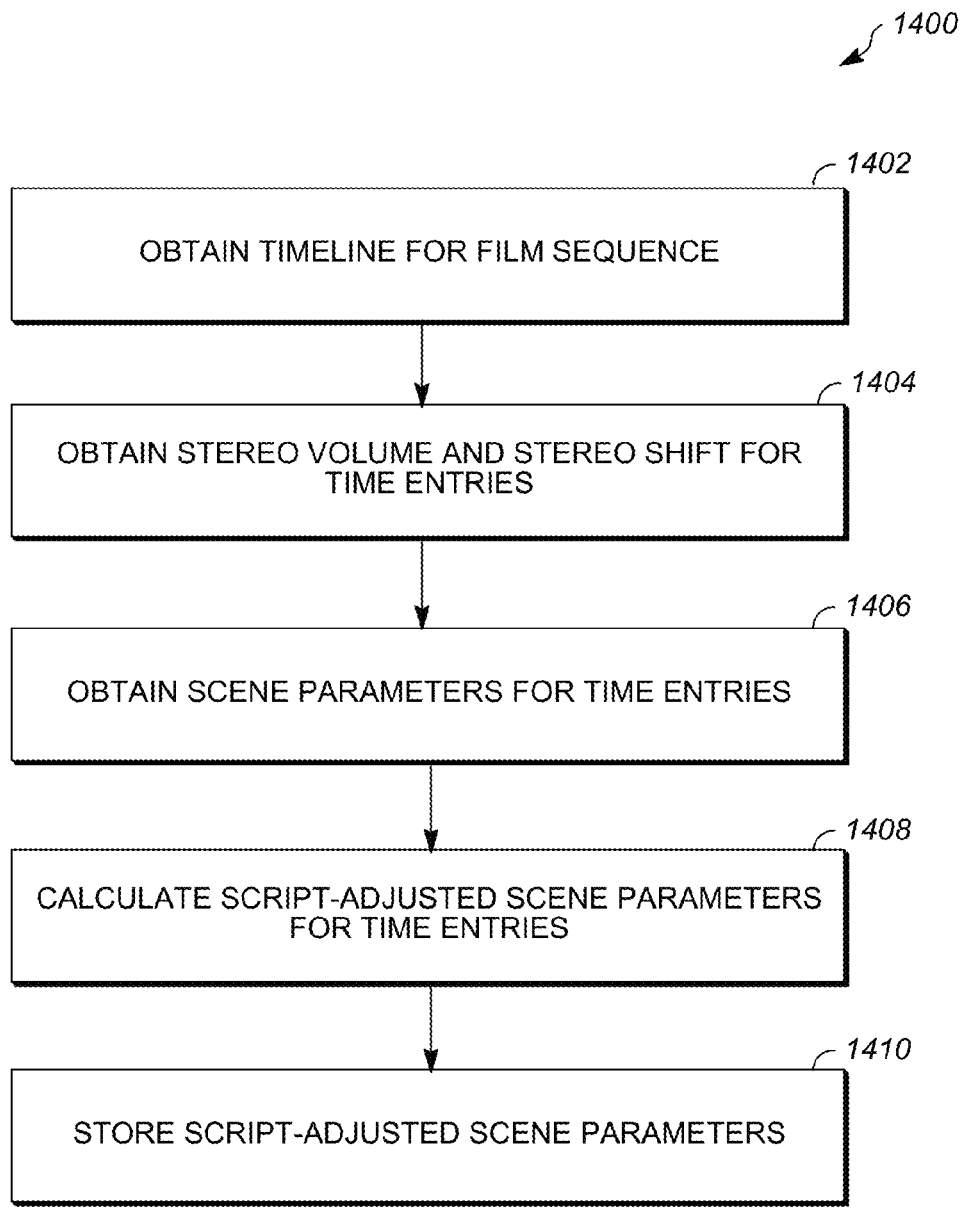
FIG. 6 depicts an exemplary process for adjusting a set of scene parameters based on a stereo depth script.

FIG. 6 depicts an exemplary process 1400 for calculating script-adjusted stereo parameters for a computer-animated film sequence. Using process 1400 a filmmaker can specify how the stereo effect changes over time and produce a complete stereo experience that is adapted for the storyline of the film sequence. Specifically, using a stereo-volume curve 822 and stereo-shift curve 824 (depicted in FIG. 7), process 1400 can be used to produce a scripted stereo curve 830 for the film sequence.

In operation 1402, a film-sequence timeline is obtained for the film sequence. The film-sequence timeline includes a plurality of time entries that are associated with a plurality of image frames in the film sequence. Typically, the time entries represent 1/24 second timing intervals along the film-sequence timeline. This time interval corresponds to the frame rate of a traditional film camera and can be used to produce cinematographic-quality film motion. Other time intervals may be used and it is not necessary that the time intervals be regularly spaced along the film-sequence timeline.

In operation 1404, a stereo-volume value and a stereo-shift value are obtained for at least two time entries of the plurality of time entries. The stereo-volume and stereo-shift values may be obtained based on a stereo-volume curve 822 and stereo-shift curve 824 (depicted in FIG. 7) that define the stereo-volume and stereo-shift over the film-sequence timeline 810. The stereo-volume curve 822 and stereo-shift curve 824 may be predefined by a filmmaker or director as a stereo script for the film sequence.

Similar to process 1300 discussed above, the stereo-volume value is typically expressed as a percentage. A stereo-volume value less than 100 percent is typically associated with an attenuation of the stereo effect and a stereo-volume value greater than 100 percent is typically associated with an amplification of the stereo effect. Also similar to process 1300, the stereo-shift value S is typically expressed in terms of a distance normalized by the width or resolution of the screen and may be expressed in terms of a number of pixels, where the number of pixels represents the distance across the screen or camera sensor. A positive stereo-shift value is typically associated with movement of the convergence plane towards the pair of stereoscopic cameras and a negative value is typically associated a movement of the convergence plane away from the pair of stereoscopic cameras.

In operation 1406, a set of scene parameters are obtained for the at least two time entries. In this example, a near-parallax value and a far-parallax value are obtained for each of the at least two time entries. These values may be obtained from computer memory or they may be obtained as an output of another process. As discussed above, processes 1100 and 1300 can all be used to obtain near-parallax and far-parallax values.

Alternatively, the near-parallax and far-parallax values may be obtained based on the existing computer-generated scene configuration associated with each of the at least two time entries. In particular, equations 7 and 8 discussed above, can be used to calculate the near-parallax value ns and far-parallax value fs given a set of other scene parameters, including the focal length of the pair of cameras f, the resolution of the camera sensors $R_c$, the width of the camera sensors $W_c$, the camera separation t, the convergence distance c, the minimum scene depth nd, and the maximum scene depth fd.

In operation 1408, script-adjusted scene parameters are calculated based on the stereo-volume value and stereo-shift value for each of the at least two time entries. Equations 11 and 12, below, depict an exemplary approach for calculating a script-adjusted near-parallax value ns_script and script-adjusted far-parallax value fs_script based on the stereo-volume value V and the stereo-shift value S.

$$\text{ns\_script} = (ns*V) + S, \text{ and} \quad (11)$$

$$\text{fs\_script} = (fs*V) + S, \quad (12)$$

where ns is the near-parallax value obtained in operation 1406, fs is the far-parallax value obtained in operation 1406, V is the stereo-volume value obtained in operation 1404, and S is the stereo-shift value obtained in operation 1404.

In operation 1410, the script adjusted scene parameters are stored in computer memory. The script-adjusted near-parallax and far-parallax values may be stored, for example, on a non-transitory computer-readable storage medium, such as a computer storage disk. Other computer storage examples are provided below and discussed with respect to FIG. 8.

Typically, the script-adjusted near-parallax and far-parallax values can also be used to calculate other stereoscopic parameters for multiple time entries in the film-sequence timeline. An exemplary stereo curve 830, depicted in FIG. 7 represents one of the stereoscopic parameters (near-parallax or far-parallax) as a function of time. As discussed above, equations 3 and 4 can be used to calculate a camera separation value and a convergence value for the pair of cameras based on the near-parallax and far-parallax values.

As previously discussed, the camera separation value t and the convergence distance value c may be used to position the pair of stereoscopic cameras in the computer-generated scene. Specifically, equations 5 and 6, discussed above, demonstrate the relationship between the convergence value c and parameters that directly specify the position of the pair of stereoscopic cameras. By calculating a position for the pair of cameras for multiple time entries in the film-sequence timeline, the camera position can be animated to produce the desired stereo effect that corresponds to the stereo-volume curve and stereo-shift curve. The computer-animated scene can then be filmed using the animated camera positions to produce a film sequence having the desired stereo effect.

5. Implementation on a Computer Hardware Platform

Figure 8:
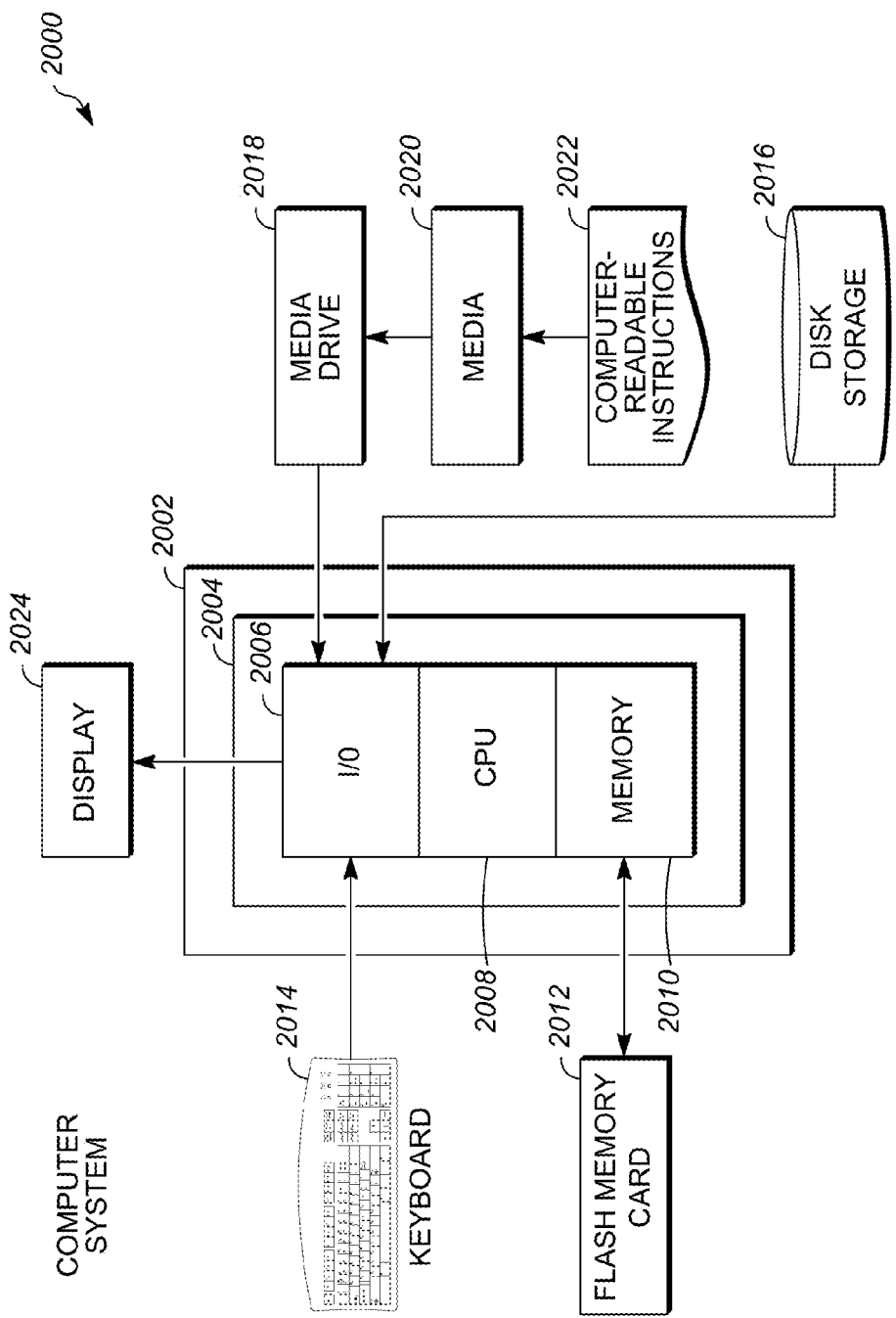
FIG. 8 depicts an exemplary computer system.

The embodiments described herein are typically implemented in the form of computer software (computer-executable instructions) executed on a computer. FIG. 8 depicts an exemplary computer system 2000 configured to perform any one of the above-described processes. In this context, computer system 2000 may be a general-purpose computer including, for example, a processor, memory, storage, and input/output devices (e.g., monitor, keyboard, disk drive, Internet connection, etc.). However, computer system 2000 may include circuitry or other specialized hardware for carrying out some or all aspects of the processes. In some operational settings, computer system 2000 may be configured as a system that includes one or more units, each of which is configured to carry out some aspects of the processes either in software, in hardware, or in some combination thereof. For example, in some embodiments, the process for computing the bounded-parallax constraints in accordance with the processes described above may be computed on parallel computer processors or performed on separate computer systems.

FIG. 8 depicts a computer system 2000 with a number of standard components that may be used to perform the above-described processes. The main system 2002 includes a motherboard 2004 having an input/output ("I/O") section 2006, one or more central processing units ("CPU") 2008, and a memory section 2010, which may have a flash memory card 2012 related to it. The I/O section 2006 is connected to a display 2024, a keyboard 2014, a disk storage unit 2016, and a media drive unit 2018. The media drive unit 2018 can read a computer-readable medium 2020, which typically contains computer-readable instructions 2022 and data.

At least some values based on the results of the above-described processes can be saved for subsequent use. For example, the outputs of the system, including the bounded-parallax constraints, can be saved directly in memory 2010 (e.g, RAM (Random Access Memory)) or another form of storage, such as disk storage 2016. Additionally, values derived from the bounded-parallax constraints, such as camera positions or images of the computer-generated scene, can also be saved directly in memory.

The above-described processes may be used to define the bounded-parallax constraints for a computer-generated scene. By computing the bounded-parallax constraints, a user can compose and stereoscopically film a computer-generated scene to produce a stereoscopic image that does not require excessive convergence or divergence of the viewer's eyes. This stereoscopic image may be visualized as a still image or as part of a film sequence. The stereoscopic image may be stored in memory 2010 or disk storage 2016, or viewed on a computer display 2024.

Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although the invention has been described in considerable detail with reference to certain embodiments thereof, other embodiments are possible, as will be understood to those skilled in the art.

What is claimed is:

1. A computer-implemented method for determining a user-defined stereo effect for a computer-animated film sequence the computer-animated film sequence depicting a computer-generated scene, the method comprising:
   obtaining a timeline of the film sequence, the timeline comprising a plurality of time entries;
   obtaining a stereo-volume value for at least two time entries of the plurality of time entries, wherein the stereo-volume value represents a percentage of parallax at the respective time entry;
   obtaining a stereo-shift value for the at least two time entries, wherein the stereo-shift value represents a distance across one of:
      an area associated with a sensor of a pair of stereoscopic cameras adapted to capture a stereoscopic image of the computer-generated scene, and
      a screen adapted to depict the stereoscopic image of the computer-generated scene;
   obtain a near-parallax value and a far-parallax value for the at least two time entries;
   for the at least two time entries, calculate a script-adjusted near-parallax value based on the stereo-shift value and the product of the stereo-volume and the near-parallax value;
   for the at least two time entries, calculate a script-adjusted far-parallax value based on the stereo-shift value and the product of the stereo-volume and the far-parallax value; and
   storing, in a computer memory, the script-adjusted near-parallax value and script-adjusted far-parallax value.

2. The computer-implemented method of claim 1, further comprising:
   positioning each camera of the pair of stereoscopic cameras relative to each other based on the script-adjusted near-parallax value and the script-adjusted far-parallax value;
   creating a stereoscopic film sequence of the computer-generated scene using the pair of stereoscopic cameras; and
   storing, in the computer memory, the stereoscopic film sequence.

3. The computer-implemented method of claim 1, further comprising:
   calculating a camera separation value and a convergence value for the pair of stereoscopic cameras based on the script-adjusted near-parallax value and the script-adjusted far-parallax value; and
   storing, in the computer memory, the camera separation value and the convergence value.

4. The computer-implemented method of claim 3, further comprising positioning each camera of the pair of stereoscopic cameras relative to each other within the computer-generated scene based on the camera separation value and the convergence value.

5. The computer-implemented method of claim 3, further comprising positioning
a camera sensor of the pair of stereoscopic cameras within the computer-generated scene based on the camera separation value and the convergence value.

6. The computer-implemented method of claim 1, wherein the plurality of time entries correspond to a sequence of image frames in an animated film sequence.

7. The computer-implemented method of claim 1, wherein the stereo-volume values and the stereo-shift values are obtained from a stereo script curve that defines the values for the timeline of the film sequence.

8. The computer-implemented method of claim 1, wherein the stereo-volume value is specified as a percentage value such that: values greater than 100 percent correspond to an amplification of a stereo effect, and values less than 100 percent correspond to an attenuation of the stereo effect, wherein the stereo effect represents an overall amount of parallax in a stereoscopic image of the computer-generated scene.

9. The computer implemented method of claim 1, wherein obtaining the near-parallax value and a far-parallax value comprises:
calculating a minimum scene depth, wherein the minimum scene depth is the distance from the pair of stereoscopic cameras to a nearest point of interest in the computer-generated scene;
calculating a near-parallax value based on a focal length of the pair of stereoscopic cameras and the minimum scene depth,
wherein calculating the near-parallax value includes selecting a baseline stereo-setting entry from a set of stereo-setting entries,
wherein each stereo-setting entry of the set of baseline stereo-setting entries includes a recommended scene depth, a recommended focal length, and a recommended near-parallax value,
wherein for the selected baseline stereo-setting entry:
the recommended scene depth corresponds to the minimum scene depth, and
the recommended focal length corresponds to the focal length; and
calculating the far-parallax value based on the focal length.

10. A computer system for determining a user-defined stereo effect for a computer-animated film sequence depicting a computer-generated scene, the system comprising:
a computer memory;
a processor for executing computer-readable instructions, the instructions for:
obtaining a timeline for the film sequence, the timeline comprising a plurality of time entries;
obtaining a stereo-volume value for at least two time entries of the plurality of time entries, wherein the stereo-volume value represents a percentage of parallax at the respective time entry;
obtaining a stereo-shift value for the at least two time entries, wherein the stereo-shift value represents a distance across one of:
an area associated with a sensor of a pair of stereoscopic cameras adapted to capture a stereoscopic image of the computer-generated scene, and
a screen adapted to depict the stereoscopic image of the computer-generated scene;

obtain a near-parallax value and a far-parallax value for the at least two time entries;
for the at least two time entries, calculate a script-adjusted near-parallax value based on the stereo-shift value and the product of the stereo-volume and the near-parallax value;
for the at least two time entries, calculate a script-adjusted far-parallax value based on the stereo-shift value and the product of the stereo-volume and the far-parallax value; and
storing, in the computer memory, the script-adjusted near-parallax value and script-adjusted far-parallax values.

11. The computer system of claim 10, the instructions further comprising:
positioning each camera of the pair of stereoscopic cameras relative to each other based on the script-adjusted near-parallax value and the script-adjusted far-parallax value;
creating a stereoscopic film sequence of the computer-generated scene with the pair of stereoscopic cameras; and
storing, in the computer memory, the stereoscopic film sequence.

12. The computer system of claim 10, the instructions further comprising:
calculating a camera separation value and a convergence value for the pair of stereoscopic cameras based on the script-adjusted near-parallax value and the script-adjusted far-parallax value; and
storing, in the computer memory, the camera separation value and the convergence value.

13. The computer system of claim 12, the instructions further comprising
Positioning each camera of the pair of stereoscopic cameras relative to each other within the computer-generated scene based on the camera separation value and the convergence value.

14. The computer system of claim 10, wherein the plurality of time entries correspond to a sequence of image frames in an animated film sequence.

15. The computer system of claim 10, wherein the stereo-volume values and the stereo-shift values are obtained from a stereo script curve that defines the values for the timeline of the film sequence.

16. A non-transitory computer-readable storage medium including computer-readable instructions that when executed on a computer processor cause the computer processor to determine a user-defined stereo effect for a computer-animated film sequence depicting a computer-generated scene, the instructions comprising:
obtaining a timeline for the film sequence, the timeline comprising a plurality of time entries;
obtaining a stereo-volume value for at least two time entries of the plurality of time entries, wherein the stereo-volume value represents a percentage of parallax at the respective time entry;
obtaining a stereo-shift value for the at least two time entries, wherein the stereo-shift value represents a distance across one of:
an area associated with a sensor of a pair of stereoscopic cameras adapted to capture a stereoscopic image of the computer-generated scene, and
a screen adapted to depict a stereoscopic image of the computer-generated scene;
obtain a near-parallax value and a far-parallax value for the at least two time entries;

for the at least two time entries, calculate a script-adjusted near-parallax value based on the stereo-shift value and the product of the stereo-volume and the near-parallax value;

for the at least two time entries, calculate a script-adjusted far-parallax value based on the stereo-shift value and the product of the stereo-volume and the far-parallax value; and storing, in a computer memory, the script-adjusted near-parallax value and script-adjusted far-parallax values.

17. The non-transitory computer-readable storage medium of claim 16, the instructions further comprising:

positioning each camera of the pair of stereoscopic cameras relative to each other based on the script-adjusted near-parallax value and the script-adjusted far-parallax value;

creating a stereoscopic film sequence of the computer-generated scene with the pair of stereoscopic cameras; and storing, in the computer memory, the stereoscopic film sequence.

18. The non-transitory computer-readable storage medium of claim 16, the instructions further comprising:

calculating a camera separation value and a convergence value for the pair of stereoscopic cameras based on the script-adjusted near-parallax value and the script-adjusted far-parallax value; and storing, in the computer memory, the camera separation value and the convergence value.

19. The non-transitory computer-readable storage medium of claim 18, the instructions further comprising:

positioning each camera of the pair of stereoscopic cameras relative to each other within the computer-generated scene based on the camera separation value and the convergence value.

20. The non-transitory computer-readable storage medium of claim 16, wherein the plurality of time entries corresponds to a sequence of image frames in an animated film sequence.

21. The non-transitory computer-readable storage medium of claim 16, wherein the stereo-volume values and the stereo-shift values are obtained from a stereo script curve that defines the values for the timeline of the film sequence.

* * * * *